United States Patent [19]

Muggli et al.

[11] 4,081,626
[45] Mar. 28, 1978

[54] ELECTROSTATIC TRANSDUCER HAVING NARROWED DIRECTIONAL CHARACTERISTIC

[75] Inventors: Juerg Muggli, Woburn; Manfred G. Specht, Newton, both of Mass.

[73] Assignee: Polaroid Corporation, Cambridge, Mass.

[21] Appl. No.: 741,228

[22] Filed: Nov. 12, 1976

[51] Int. Cl.² .................................... H04R 19/00
[52] U.S. Cl. .................................... 179/111 R
[58] Field of Search ................ 179/111 R, 111 E

[56] References Cited

U.S. PATENT DOCUMENTS

| Re. 28,420 | 5/1975 | Murphy | 179/111 E |
| 2,910,539 | 10/1959 | Hartsfield | 179/111 R |
| 3,118,979 | 1/1964 | Sessler et al. | 179/111 R |
| 3,430,146 | 2/1969 | Chua | 179/111 R |
| 3,814,864 | 6/1974 | Victoreen | 179/111 R |
| 3,816,671 | 6/1974 | Fraim et al. | 179/111 R |
| 3,958,662 | 5/1976 | Brzezinski et al. | 179/111 R |

FOREIGN PATENT DOCUMENTS

| 45-5818 | 2/1970 | Japan | 179/111 R |
| 849,487 | 9/1960 | United Kingdom | 179/111 R |
| 420,390 | 11/1934 | United Kingdom | 179/111 R |
| 258,476 | 11/1926 | United Kingdom | 179/111 R |

OTHER PUBLICATIONS

AWA Technical Review, Dec. 1973, vol. 15, No. 2, pp. 53-64, "Application of Electreis to Electro-Acoustic Transducers", R. E. Collins.

*Primary Examiner*—George G. Stellar
*Attorney, Agent, or Firm*—David R. Thornton

[57] ABSTRACT

A Sell-type transducer for use in an ultrasonic ranging system for a camera has a hollow base containing a floating backplate having a grooved surface in contact with the non-metallic surface of a metallized plastic diaphragm stretched across the base. A spring arrangement urges the floating backplate into engagement with the diaphragm to maintain tension thereon in the event long-term plastic flow occurs in the diaphragm. Improved side lobe suppression is achieved by progressively decreasing the depth of the grooves as the periphery is approached. Further, for repeatability, the crests of the grooves define a convex surface.

23 Claims, 10 Drawing Figures

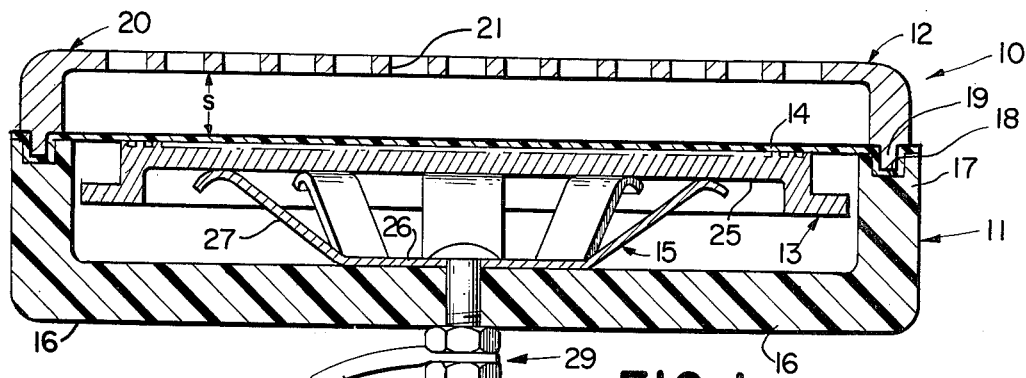
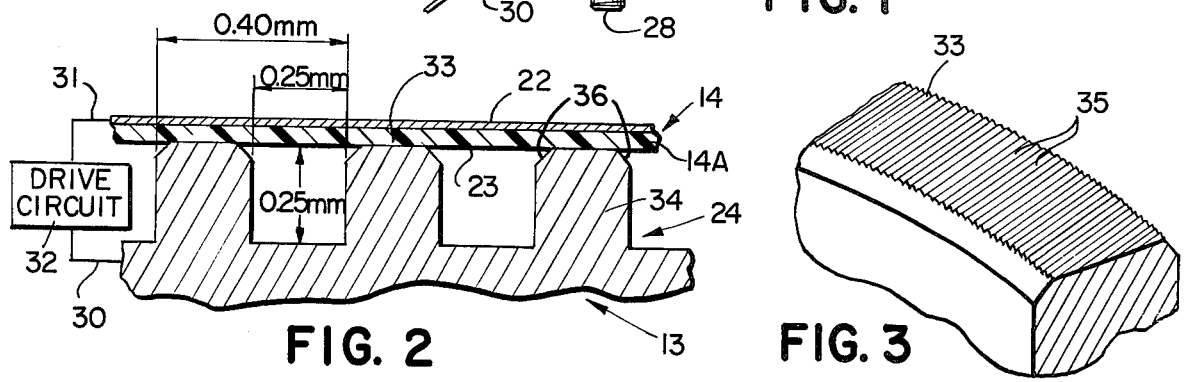
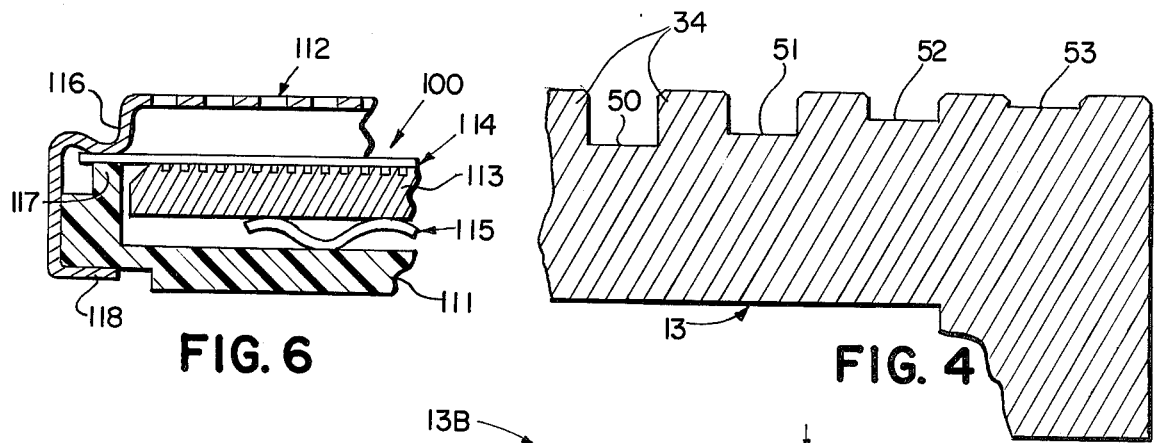
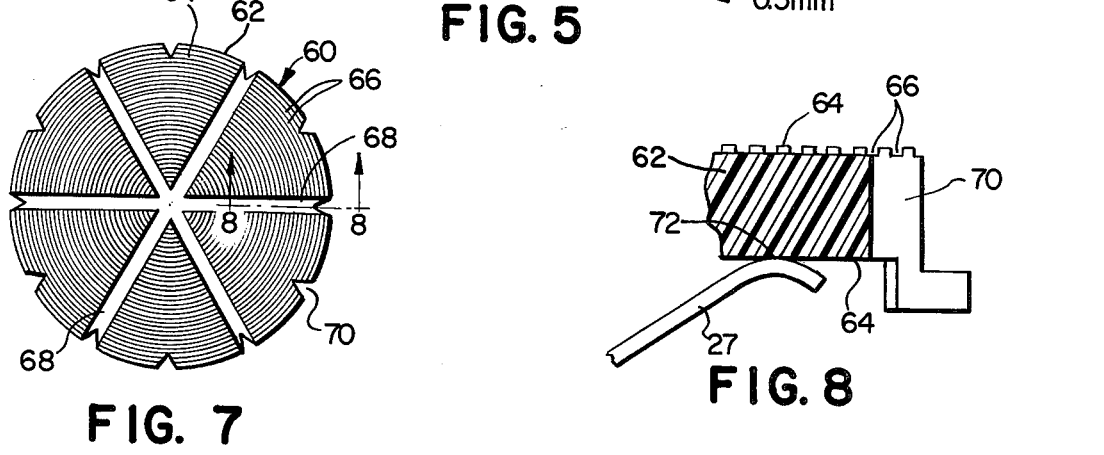

ELECTROSTATIC TRANSDUCER HAVING NARROWED DIRECTIONAL CHARACTERISTIC

BACKGROUND OF THE INVENTION

This invention relates to ultrasonic transducers, and more particularly to Sell-type electrostatic transducers for use with an ultrasonic ranging system for a camera.

Ultrasonic ranging systems for cameras are disclosed in U.S. Pat. No. 3,522,764, German Pat. No. 864,048 and IBM Technical Disclosure Bulletin, Volume 9, No. 7, December, 1966, pp. 744–745. In each of these systems, periodic bursts of ultrasonic energy are transmitted toward a subject to be photographed, and the subject reflects some of the energy back to the camera. Simultaneous characteristics of the transmitted and received signals are compared necessitating separate sending and receiving transducers; and a control signal representative of subject distances is produced. The control signal is used to drive the lens mount of the camera to a position functionally related to subject distance whereby the subject is brought into focus.

Copending patent application Ser. No. 729,392, filed Oct. 4, 1976, discloses a ranging system for focusing a camera in response to transmission of a single burst of ultrasonic energy, the frequency of the burst varying from 65 to 50 kHz. This arrangement allows ranging, focusing and shutter actuation to take place sequentially in a relatively short time, as compared to human reflex time, in response to manual depression of a shutter release button, for example. To be practical, the transducer of a single burst ranging system must have a high mechanical damping factor to insure rapid decay of vibrations after termination of the driving signal in preparation for receipt of an echo. In addition, the electromechanical coupling of the transducer to the medium must be strong since the transducer must transmit the burst as well as receive its echo. The closest object that can be detected depends upon the time required for the vibration of the transducer to decay after the driving signal terminates. If the camera ranging system is to focus on objects as close as 25 cm, the decay must be completed with 0.3 msec.

A transducer with requisite mechanical damping and electromechanical coupling is the so-called Sell-transducer originally developed by H. Sell in 1937. In such transducer, a thin (i.e., 5–10 $\mu$m) plastic film, metallized on one surface to form an electrode, is stretched over a relatively massive metallic counter-electrode, hereinafter termed the backplate, with the non-conductive surface of the film in contact with the backplate. The metallized surface of the film separated by the insulating film from the backplate defines a capacitor such that when a dc voltage is applied across the electrodes of this capacitor, irregularities on the surface of the backplate set up localized concentrated electric fields in the film. When an ac signal is superimposed on the dc bias during a transmission mode of operation, the film is stressed and oscillatory formations develop causing an acoustic wavefront to be propagated from the diaphragm. During a receive mode, a variable acoustic pressure on the diaphragm moves the film, producing a variable voltage across the electrodes.

The surface characteristics of the backplate apparently determine the frequency range and sensitivity of the transducer. With a very smooth, highly polished surface, the frequency range extends to 500 kHz although the sensitivity is rather low. With a surface roughened by sandblasting, or provided with grooves, the sensitivity is higher, but the upper frequency limit is lower.

In an article by K. Geide entitled "Oscillation Characteristics of Electrostatic Transducers Using the Sell Principle" appearing in Acustica, Volume 10, 1960, pp. 295–303, it is disclosed that a grooved backplate will maximize radiation of acoustic energy at frequencies in the range 5 to 80 kHz at atmospheric pressure. Experiments on a Sell-type transducer have been reported by D. Anke in an article entitled "Air Transducer Using the Sell Principle for Frequencies from 50 kHz to 100 kHz" appearing in Acustica, Volume 30, 1974, pp. 30–39. In such experiments, grooved backplates were employed, the width of the grooves ranging from 0.25 mm to 0.5 mm.

While transducers constructed in accordance with the above will provide suitable operation for some applications, they are not well suited for portable, mass-produced articles, such as the camera of the above-noted patent application where a specific overall efficiency is desired, e.g., high output, minimum side lobes, suitable receiving characteristics, and uniformity of operation, all consistent with low-cost, mass production manufacturing.

It is, therefore, an object of the present invention to provide a sonic transducer having enhanced output characteristics.

Another object is to provide a sonic transducer of easily implemented, compact construction having high conformity and repeatability of operation.

A further object is to provide a sonic transducer for use in a sonic ranging system for a camera.

Still another object is to provide a Sell-type transducer having improved directional characteristics for both propagation and reception of sonic energy for use in a camera ranging system.

SUMMARY OF THE INVENTION

In accordance with the present invention, a Sell-type electrostatic transducer is provided for use in the frequency range of 45–70 kHz. The transducer comprises a hollow base containing a metallic backplate for defining a first electrode and having a grooved surface in contact with one surface of a plastic diaphragm stretched across the base, the other surface of the diaphragm being metallized for defining a second electrode. Means are provided on the surface of the backplate for modifying the directional characteristics of the reception and propagation fields of the transducer. In the preferred arrangement, the provision of shallower grooves near the periphery of the backplate provides improved directional characteristics. Additionally, repeatability and long life is achieved by fabricating the backplate such that the crests of the grooves define a convex surface. Also, low capacitance is achieved by uniformly scribing the crests, providing ridges thereon or by varying the height of the crests slightly around the crown curve.

In the preferred arrangement, the grooves are concentrically arranged on the surface of the backplate and have a width and depth of about 0.25 mm and a pitch of about 0.4 mm, the crest of the projections defining the grooves being beveled at 45° to remove about 25 $\mu$m from the crests.

BRIEF DESCRIPTION OF THE DRAWINGS

Embodiments of the invention are shown in the accompanying drawings wherein:

FIG. 1 is a cross-section of a Sell-type electrostatic transducer according to the present invention;

FIG. 2 is an enlarged cross-section of the backplate of the transducer shown in FIG. 1;

FIG. 3 is a perspective view of the crest of a projection on the surface of the backplate engaged with the diaphragm;

FIG. 4 is a view similar to FIG. 2 but showing the peripheral edge of the backplate illustrating the preferred decreasing depth of the grooves as the periphery is approached;

FIG. 5 is a schematic illustration of a side view of a backplate exaggerating the convexity of the surface of the backplate engageable with the diaphragm;

FIG. 6 is a sectional view of a portion of a modified version of a Sell-type transducer according to the present invention;

FIG. 7 is a plan view of an alternate construction of the backplate shown in FIG. 1;

FIG. 8 is a partial view in section of the backplate of FIG. 7 and taken along the line 8—8 thereof;

DETAILED DESCRIPTION

Figure 9:
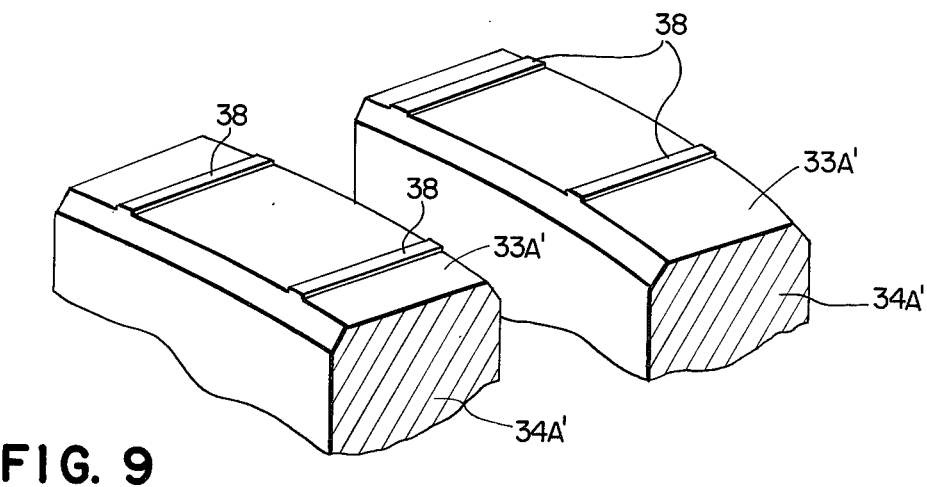
FIG. 9 is a perspective view of portions of the crests employed in the transducer of FIG. 1 showing an alternate construction of the crest surface.

Referring now to FIG. 1, reference numeral 10 designates a Sell-type transducer according to the present invention. Transducer 10 comprises base 11, cover plate 12, backplate 13, diaphragm 14, and resilient means 15. Base 11 is in the form of an open, circular cup-shaped member that is preferably formed of a rigid plastic material. It comprises a bottom wall 16 and circumferential upstanding wall 17 whose free edge is provided with a groove 18 into which tightly fits a complementarily shaped flange 19 on circular cover plate 12 which is also cup-shaped. Wall 20 of the cover plate is provided with a plurality of apertures 21 so as to be transmissive to ultrasonic energy within the frequency band 45-70 kHz. The spacing S between wall 20 and diaphragm 14 is important for optimizing the coupling between the transducer and the medium in which it operates. When a 6 mm wave (50 kHz) is to be used, S should be either very small, i.e., less than 0.5 mm or about one-half wave-length, e.g., 3 mm.

Diaphragm 14 is a circular thin sheet, preferably, as shown in FIG. 2, of dielectric material 14A coated with a thin metal layer 22 and tightly stretched over backplate 13 by reason of the entrapment of the peripheral edge of the diaphragm 14 between flange 19 on cover plate 12 and the groove 18 in wall 17 of the base 11. The "paint can" type of connection shown in FIG. 1 is intended to be illustrative of the many known ways to tightly stretch a thin film; and any other known expedient for achieving this result could be used, e.g., the periphery of the film may be adhesively affixed to the base 11 or the plate 12. As best shown in FIG. 2, top surface 22 of diaphragm 14 facing wall 20 is metallized while the bottom surface 23, which is insulating, faces bottom wall 16 of the base. The preferred diaphragm is a Kapton film, about 6 $\mu$m thick, plated on one surface with gold about 300 Angstroms thick. For frequencies in the range 45-70 kHz, the diaphragm should be about 3.5 cm in diameter.

As later explained in detail, the diaphragm need only consist of a thin metal layer. Hence, the transducer employs in essence a sandwich of a substantially non-flexible support plate (e.g. plate 13), a layer of dielectric material (e.g., layer 14A), and a thin flexible, or vibratable conductive layer. Hence, it should be understood that the term diaphragm as used herein need only specifically include the conductive vibratable layer, which may or may not be affixed to the insulative layer.

Backplate 13 is preferably metallic (aluminum being a suitable material although other metals can be used consonant with the requirement for grooving the surface of the backplate contacting the diaphragm) and is disc-shaped with an upper grooved surface 24 as shown in FIG. 2 and a lower recessed surface 25 (FIG. 1). Surface 24 of the backplate is resiliently urged into engagement with insulating bottom surface 23 of the diaphragm by resilient means 15. Resilient means 15 is in the form of a metallic spring configured to provide a biasing force of 1 to 4 Newtons and includes a circular base portion 26 and a plurality of resilient fingers 27 radially arranged with respect to the base and extending away therefrom at an inclined angle. The free ends of fingers 27 engage surface 25 of the backplate and maintain the diaphragm under tension. Resilient means 15 thus allows backplate 13 to float and be resiliently biased into engagement with the diaphragm. The base portion 26 of the spring is rigidly attached to bottom wall 16 of the base by means of metallic fastener 28 which passes through the bottom wall of the base and extends therebeyond. The exterior portion of fastener 28 terminates in electrical connection 29 to which lead 30 is electrically connected for the purpose of applying an electrical potential to the backplate 13 through the electrically conductive resilient means 15. Hence, the resilient means 15 in combination with the fastener 28 serve the dual purpose of providing both means for biasing the plate 13 into diaphragm contact and electrode and terminal means for conducting voltage to the plate.

As shown in FIG. 2, the metallized surface 22 of diaphragm 14 is connected by a lead 31 to one side of drive circuit 32, the other side of which is connected by lead 30 to the backplate 13. Circuit 32 provides a relatively large dc voltage across dielectric material 14A of the diaphragm, say 150 V; and when operating in the transmit mode, an ac voltage of a frequency from 50-70 kHz is superimposed on the dc voltage. The ac voltage is about 300 volts peak-to-peak.

Operation of the transducer requires a dc potential to be applied across the conductive surface 22 and the metallic backplate 13 as a bias. This dc voltage can be replaced by a permanent polarization of the insulating portion of the diaphragm which occurs in materials like Teflon and Mylar. In such case, the transducer would be an electret type of transducer. In this case, the effect of electret field is smaller than a dc field that can be applied.

When the transducer is to be used for ranging, the sound output should be maximized; and the phase and distribution of the output across the face of the transducer should be well defined and predictable since they determine the lobe pattern. The larger the diameter, the higher the frequency, and the more accurate the in-phase condition, the more narrow a beam produced. The output is large if the frequency is near the resonant frequency of the transducer provided the mass of the diaphragm is small, and there are a large number of grooves with reasonably sharp edges producing high local fields in the dielectric material of the diaphragm, and thus high local forces; and provided the applied voltages are high. The resonant frequency of the transducer depends on the applied voltage as well as on the parameters of the diaphragm such as its specific mass, thickness, tension and modulus of elasticity and the parameters of the backplate such as the width and depth of the grooves.

For any given arrangement there is an upper limit on the dc and ac voltages. At too high a voltage level, the output becomes smaller since the applied voltage stretches the diaphragm thus increasing its resonant frequency. In addition, depending on the form of the grooves, the insulating material tends to charge up thus decreasing the output with time; and at even higher voltage, local breakdown of the dielectric occurs and the voltage punches through. The grooves should not be too shallow since the dynamic compression of the trapped air increases the resonant frequency. The ideal diaphragm thus has to be hard, light and extremely thin. The insulating part should withstand high fields without charging up or allowing punch-through to occur.

As shown in FIG. 2, the crests 33 of the plurality of square projections 34, which define the concentric grooves of surface 24 of the backplate, are engaged with the insulating surface 23 of the diaphragm which is held taut between the cover plate and the base, resilient means 15 serving to maintain the crests in intimate contact with the insulating surface. Preferably, the projections 34 are about 0.15 mm wide and are spaced about 0.4 mm apart. Thus, the grooves are spaced apart a distance of 0.15 mm and the pitch of the grooves is about 0.4 mm. The free end of each projection 34, adjacent crest 33, is preferably provided with a bevel 36 for modifying the localized electric field in the dielectric material 14A where it contacts a crest. This has a beneficial effect on the repeatability of the output characteristics of the transducer. The preferred bevel is about 45° as indicated in FIG. 3 whereby about 25 $\mu$m is removed from each crest along its longitudinal edges.

Between the projections 34, the diaphragm is freely moveable and can be excited so that it oscillates under the influence of the electrostatic forces applied across the metallic surface 22 and the conducting backplate 13 by reason of drive circuit 32. In the Sell-type electrostatic transducer, it is important that at least some portions of the crests remain in intimate engagement with the non-conductive surface of the diaphragm thus distinguishing this type of transducer from the transducer disclosed in U.S. Pat. No. 3,523,275. Resilient means 15 continually biases the backplate into contact, and is particularly important when the diaphragm is a plastic film such as Mylar, which has a tendency to "creep" when it remains under tension over a long period of time. However, this bias alone often fails to provide sufficient standardization between similarly constructed transducers or repeatability of a given transducer, initially or during long life.

To provide the latter advantages, the upper surface of the novel backplate 13 defined by the crests 33 of the projections 34 is slightly crowned or, that is, formed with a convex curvature. In other words, the center of the backplate should be slightly higher than the peripheral edges, i.e., for a 35 mm diameter backplate, designed for the 45–70 kHz region, the elevation of the center of the backplate should be about 0.5 mm above the periphery. This curvature is shown in exaggerated form in FIG. 5.

Figure 10:
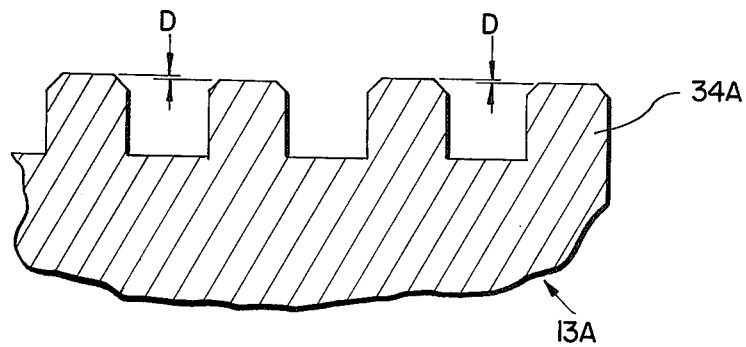
FIG. 10 is an enlarged cross-section of a portion of an alternate version of the backplate of FIG. 2.

In addition to the repeatability noted above, a low value of capacitance is preferred so as to reduce the required current, thereby permitting the use of drive electronics having low current ratings. Further, a low capacitance improves reception since a better signal versus thermal noise is achieved. Lower capacitance may be provided by sandblasting the contact surface, i.e., the projection crest, however, the latter can produce repeatability problems. In the preferred embodiments, the projections or the crests are uniformly striated so as to provide uniform contact with reduced contact area. For example, relatively uniform crosshatching or scribing of the crest surfaces as shown in FIG. 3 may be utilized; a scribe depth of 5 to 10 $\mu$m being suitable. Moreover, as shown in FIG. 9, the projections 34 may carry relatively small uniformly spaced projections 38 extending laterally across each crest 33; preferably approximately perpendicular to each; perpendicular scribing or projections 38 being preferred to reduce the length of the crest portion actually in contact with the diaphragm. The small ridges or projections 38 may range up to 100 $\mu$m wide with a height of 10 $\mu$m and spaced apart 0.5 mm. Closer spacing of the small projections 38 may be utilized when these projections are of less height than the above-noted value. An alternate arrangement, providing low capacitance is to vary the crest height by 5 to 10 $\mu$m. That is, as shown at D in FIG. 10, every other, or every third crest ring would deviate from the crowned surface by the above amount.

The far field angular distribution of radiated waves created by the moving diaphragm is determined by the amplitude of oscillation of the diaphragm at different points across the face thereof. It has been found that the directional characteristics of the reception and propagation fields of the transducer can be modified so as to reduce side lobes by providing a different configuration of the grooves or projections near the periphery of the backplate as compared to the configuration near the center.

That is, the grooves and projections are optimized in the center to maximize the output for the frequency of interest and are varied from this optimum structure as the perimeter is approached so as to reduce the output (for the given frequency) at the perimeter and thereby suppress the sidelobes. Preferably, this variation from the optimum structure should be a progressive variation following a generally smooth curve which is approximately constant from the center out to about one-half the radius and which then smoothly varies as the perimeter is approached.

Since the width of the projections and grooves are more critical, the depth of the grooves are preferably varied. This arrangement is shown in FIG. 4 where the grooves 50 near the periphery 51 of the backplate 13 are shallower than the grooves closer to the center of the backplate.

Preferably, the depth of the grooves decreases in conformance with a smooth curve as the periphery of the backplate is approached. The change in depth of the grooves from the center to approximately one-half the radius being preferrably slight so that these grooves remain essentially of constant depth, e.g., 250 $\mu$m while from approximately the one-half radius point, the depth of the grooves then decreases following a generally smooth curve to a very shallow groove of, for example, 50 μm. This is shown in FIG. 4 wherein the outer four grooves designated 50 to 53 are shown with groove 51 being of less depth than groove 50 and the decreasing depth continuing until the peripheral groove 53 is reached.

Turning again to the diaphragm 14, it should be noted that while a Kapton film diaphragm is presently preferred for the insulative layer 14A, the latter can be made from many different types of insulating materials such as those known by the trade names Mylar, Teflon, Kimfol, Kimfone, etc. Alternatively, the diaphragm can be made from a metallic foil of beryllium, aluminum or titanium as suggested in Japanese Patent Specification 45–5818 published Feb. 26, 1970. In such case, an insulating coating is preferably applied to the foil and oriented in the transducer such that the insulating coating faces the metallic backplate.

Moreover, a metallic backplate, or a conductively plated non-metallic backplate can be provided with an insulating coating and used directly with a metallic foil without the necessity for coating the foil with an insulating coating.

It is also possible to utilize a non-metallic backplate; and in such a case, a conductive plating would be applied to the grooved surface 24. The plating should be of a material and of a thickness that provides a resistance less than about 1 kilo-ohm per square. A backplate 60 constructed in this manner is shown in FIGS. 7 and 8, and comprises an insulative support 62 of rigid plastic coated or plated with a conductive layer 64. The plate 60 includes a plurality of concentric grooves 66 constructed as in the embodiment of FIG. 1. Additionally, radial grooves 68 extend across the face of the support 62 to the depth of the concentric grooves 66 to ensure plating connection across the plate surface, that is, within the grooves and across the crests.

In this embodiment, electrical connection to the layer 64 is provided as in the preferred embodiment by spring arm 27 bearing against the rear surface 72. Hence, the plate 60 is metallized over its peripheral edge to the rear surface. To preclude removal of this edge coating due to possible rubbing of this edge on the transducer shell, a plurality of spaced, small edge cuts or notches 70 are provided. The latter provide means permitting extension of the layer 64 through the plate 60 to its rear surface. Alternatively, other plate openings may also be suitable.

Referring now to FIG. 6, a modified version of the transducer is indicated by reference number 100. Transducer 100 includes base 111, diaphragm 114 interposed between the base and cover 112, and backplate 113 urged into engagement with the diaphragm by undulated spring 115 interposed between the base and the backplate. Cover plate 112 is provided with a peripheral downturned portion 116 that engages and captures the periphery of diaphragm 114 against the upturned flange 117 of the base. Pressure on the periphery of the diaphragm is maintained by folding or rolling over the free end 118 of the cover 112 into engagement with the underside of the base as indicated in FIG. 6. The inherent resiliency of the cover material will insure that no slippage of the diaphragm occurs with respect to the base; and tension in the diaphragm will be maintained. Hence, the cover 112 is formed with a "U" shaped periphery in peripheral clamping engagement with the diaphragm 114 and base 111 thereby forcing the diaphragm against the periphery of the upper surface of the base 111 due to the force exerted by the cover 112, and specifically lip 118, against the periphery of the lower surface of the base.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. An electrostatic sonic transducer comprising a backplate, a layer of conductive material stretched over one major surface of said backplate with an insulating layer interposed between said conductive layer and said backplate said backplate being formed of substantially non-conductive material having a metallized coating extending across said one major surface and at least portions of said opposite major surface thereof, said backplate carrying indentations at its periphery for providing metallized connections between said one and said opposite surfaces, and means for connecting an external voltage source to said portions of said coating on said opposite major surface.

2. The transducer of claim 1 wherein said one major surface is formed with a plurality of generally concentric projections spaced by intervening grooves, and said plate includes at least one radially extending slot extending to a depth approximately equal to said grooves thereby insuring connection of the metallized coating on said one surface from one projection to the next.

3. An electrostatic sonic transducer comprising a relatively inflexible support plate having at least one major surface thereof formed of conductive material so as to provide a first conductive layer, a relatively flexible layer of conductive material forming a second conductive layer stretched across said one major surface with a layer of insulative material disposed between said second conductive layer and said one major surface, said major surface being formed so that portions thereof in contact with said insulative material define a generally convex curvature to provide reliable contact between layers, said one major surface being defined by a plurality of projections spaced apart by intervening grooves, with the configuration of said projections and grooves being optimized for maximum output at a given frequency near the center of said one major surface and varied from said optimum near the periphery thereof so as to reduce the side lobe radiation of said transducer.

4. The transducer of claim 3 wherein said projections and grooves are concentric circles.

5. The transducer of claim 3 wherein the depth of said grooves are different near said periphery of said one major surface as compared to the depth of said grooves near said center thereof.

6. The transducer of claim 3 wherein said projections and grooves are concentric, and the depth of said grooves are shallower near said periphery of said one major surface as compared to the depth of said grooves near the center thereof.

7. The transducer of claim 3 wherein said projections and grooves are concentric, and the depth of said grooves are approximately constant from said center of said plate to about one-half the radius of said plate and then progressively decrease in depth to a relatively shallow groove at said periphery.

8. An electrostatic sonic transducer comprising a relatively inflexible support plate having at least one major surface thereof formed of conductive material so as to provide a first conductive layer and a relatively flexible layer of conductive material forming a second conductive layer stretched across said one major surface with a layer of insulative material disposed between said second conductive layer and said one major surface, said one major surface being defined by a plurality of projections spaced apart by intervening grooves, and the crest of said projections include substantially uniform surface variations formed by substantially uniform striations.

9. An electrostatic sonic transducer comprising a relatively inflexible support plate having at least one major surface thereof formed of conductive material, a relatively flexible layer of conductive material stretched across said one major surface with a layer of insulative material disposed between said flexible conductive layer and said one major surface, said major surface being formed so that portions thereof in contact with said insulative material define a generally convex curvature to provide reliable contact between said layers, said one major surface being defined by a plurality of projections spaced by intervening grooves, the crest of one said projection deviating from said convex curvature as compared to an adjacent or next adjacent projection to define an undulating convex curvature of said one major surface.

10. The transducer of claim 9 wherein said projections and grooves are concentric circles, and said crest of said one projection deviates by 5 to 10 $\mu$m from said curvature as compared to said adjacent or next adjacent projection.

11. An electrostatic sonic transducer comprising a relatively inflexible support plate having at least one major surface thereof formed of conductive material so as to provide a first conductive layer, a relatively flexible layer of conductive material forming a second conductive layer stretched across said one major surface with a layer of insulative material disposed between said second conductive layer and said one major surface, said major surface being formed so that portions thereof in contact with said insulative material define a generally convex curvature to provide reliable contact between said layers, said one major surface being defined by a plurality of projections spaced by intervening grooves, and the crests of said projections include sequentially uniform scribing.

12. The transducer of claim 11 wherein at least some said grooves are to a depth of approximately 0.25 mm and said scribing ranges up to a depth of approximately 10 $\mu$m.

13. An electrostatic transducer comprising a relatively inflexible support plate having at least one major surface thereof formed of conductive material, a relatively flexible layer of conductive material tightly stretched across said one major surface with a layer of insulative material disposed between said conductive material and said one major surface, said major surface being defined by a series of projections spaced apart by intervening grooves, and the configuration of said projections and grooves being optimized for maximum output at a given frequency near the center of said one major surface and varied from said optimum near the periphery thereof so as to reduce the side lobe radiation of said transducer.

14. The transducer of claim 13 wherein said projections and grooves are concentric and wherein the dimensions of width and height of said projections and grooves are optimized for maximum output at said given frequency near said center of said one major surface, and at least one of said dimensions being varied from said optimum near said periphery of said one major surface to reduce said side lobe radiation.

15. The transducer of claim 13 wherein the configuration of said grooves are different near said periphery of said one major surface.

16. The transducer of claim 13 wherein said grooves are shallower near said periphery of said one major surface thereby suppressing the sidelobes of said transducer.

17. The transducer of claim 13 wherein the depth of said grooves are approximately constant from said center of said one major surface to about one-half the radius thereof and then progressively decrease in depth to a relatively shallow groove near said periphery.

18. The transducer of claim 16 wherein said grooves are substantially concentric circles.

19. An electrostatic transducer comprising a relatively inflexible support plate having at least one major surface thereof formed of conductive material, a relatively flexible layer of conductive material tightly stretched across said one major surface with a layer of insulative material disposed between said flexible layer of conductive material and said one major surface, said major surface being defined by a series of projections spaced apart by intervening grooves, and the crests of said projections having substantially uniform striations.

20. The transducer of claim 19 wherein said projections are approximately 0.25 mm high and said striations are uniform scribing on the crests thereof to a depth of 5 to 10 $\mu$m.

21. The transducer of claim 19 wherein said striations extend approximately perpendicularly across said projections.

22. The transducer of claim 19 wherein said striations comprise raised ridges extending approximately transversely across the crests of said projections, said ridges being substantially uniformly spaced along the length of said projections and of narrow width and relatively short height as compared to said projections.

23. The transducer of claim 22 wherein at least some of said projections have a height of approximately 0.25 mm and said ridges thereon range up to a height of 10 $\mu$m.

* * * * *